I. Allard,
Screw Driver,
No. 80,583. Patented Aug. 4, 1868.
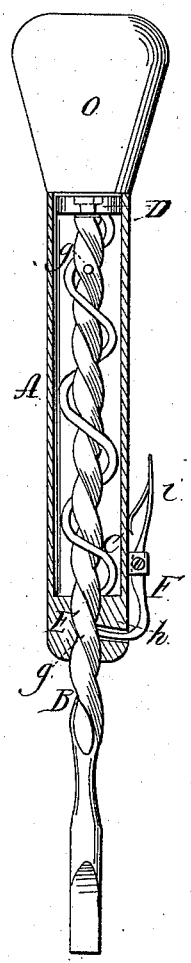
Witnesses:
Wm. A. Morgan
J. C. Cotton
Inventor:
Isaac Allard
per Munn & Co.
Attorneys

United States Patent Office.

ISAAC ALLARD, OF BELFAST, MAINE, ASSIGNOR TO HIMSELF AND FRANK A. HOWARD, OF SAME PLACE.

*Letters Patent No. 80,583, dated August 4, 1868.*

IMPROVEMENT IN SCREW-DRIVERS.

*The Schedule referred to in these Letters Patent and making part of the same.*

TO ALL WHOM IT MAY CONCERN:

Be it known that I, ISAAC ALLARD, of Belfast, in the county of Waldo, and State of Maine, have invented a new and improved Screw-Driver; and I do hereby declare that the following is a full, clear, and exact description thereof, which will enable those skilled in the art to make and use the same, reference being had to the accompanying drawings, forming part of this specification.

This invention relates to an improvement in screw-drivers, whereby they are made much more convenient and effective than those made in the ordinary manner.

And it consists in making the shank of the screw-driver in a spiral form, by twisting or otherwise, and operating it in a tube by a spiral spring, whereby the screw-driver is made self-revolving, in the manner hereinafter described.

The drawing represents a longitudinal section of a screw-driver made according to my invention.

Similar letters of reference indicate corresponding parts.

A is the tube.

B is the spiral shank.

C is a spiral spring, which is coiled around the shank B.

D is a follower, on the end of the shank, which is made to fit the tube, and which guides the shank as it is forced back and forth in the tube.

E is a nut in the end of the tube through which the shank passes, receiving therefrom a revolving motion, when passing in either direction.

F is a spring-catch, by which the shank is held stationary, there being holes, $g$, in the shank, which the end, $h$, of the catch enters, and prevents it from revolving or moving up and down.

The spring C is attached to the follower D, and to the nut E. As represented in the drawing, it is stretched or elongated, and its tendency is to force the shank from the tube when the shank is released by pressing on the thumb-piece $i$, and raising the catch.

To operate the screw-driver in driving wood-screws, insert the bit $n$ in the slit of the screw, and then press down the thumb-piece $i$. This releases the shank, and the recoil of the spring will force the shank from the tube, which revolves at the same time, thus turning the screw into the wood, while the operator holds the handle $o$ firmly in his hand.

As seen in the drawing, the shank is held by the catch F, with the shank extended. The catch is inserted in the upper hole $g$.

The tool can be used in the first position named, or, as seen, as a short stationary screw-driver, and in the latter case, with the shank extended, as a long one.

The advantages of this arrangement, whereby a self-revolving, and a long as well as a short screw-driver are secured, will at once be appreciated by all.

I claim as new, and desire to secure by Letters Patent—

1. The tube A, the spiral shank B, and the spring C, when the same are constructed, arranged, and operated substantially as and for the purposes shown and described.

2. The spring-catch F, in combination with the spiral shank B and tube A, as herein described for the purpose specified.

ISAAC ALLARD.

Witnesses:
TIMOTHY CHASE,
A. D. CHASE.